US00RE43710E

(19) United States
(12) Reissued Patent
Spear et al.

(10) Patent Number: US RE43,710 E
(45) **Date of Reissued Patent: *Oct. 2, 2012**

(54) SWEPT TURBOMACHINERY BLADE

(75) Inventors: David A. Spear, Manchester, CT (US); Dennis N. Kantor, legal representative, East Hartford, CT (US); Bruce P. Biederman, West Hartford, CT (US); John A. Orosa, Palm Beach Gardens, FL (US)

(73) Assignee: United Technologies Corp., Hartford, CT (US)

( * ) Notice: This patent is subject to a terminal disclaimer.

(21) Appl. No.: 09/874,931

(22) Filed: Jun. 5, 2001

Related U.S. Patent Documents

Reissue of:
(64) Patent No.: 5,642,985
Issued: Jul. 1, 1997
Appl. No.: 08/559,965
Filed: Nov. 17, 1995

U.S. Applications:
(63) Continuation of application No. 09/343,736, filed on Jun. 30, 1999, now Pat. No. Re. 38,040.

(51) Int. Cl.
*F01D 5/14* (2006.01)
(52) U.S. Cl. ..... 416/238; 416/242; 415/181
(58) Field of Classification Search ..... 415/181, 415/220, 222, 173.1, 173.5; 416/238, 242, 416/243, 228
See application file for complete search history.

(56) References Cited

U.S. PATENT DOCUMENTS

| | | | | |
|---|---|---|---|---|
| 1,964,525 | A | 6/1934 | McMahan | |
| 2,154,313 | A | 4/1939 | McMahan | |
| 2,628,768 | A | 2/1953 | Kantrowitz | |
| 2,660,401 | A | 11/1953 | Hull, Jr. | |
| 2,689,681 | A | 9/1954 | Sabatiuk | |
| 2,735,612 | A * | 2/1956 | Hausmann | 415/208.1 |
| 2,830,753 | A * | 4/1958 | Stalker | 415/222 |

(Continued)

FOREIGN PATENT DOCUMENTS

| | | | | |
|---|---|---|---|---|
| CZ | 110505 | A * | 4/1964 | 415/181 |

(Continued)

OTHER PUBLICATIONS

Puterbaugh et al., "Design of a Rotor Incorporating Meridional Sweep and Circumferential Lean for Shock Loss Attenuation," Feb. 1987, Contract AFWAL-TR-86-2013, Aero Propulsion Laboratories, Air Force Wright Aeronautical Laboratories, Wright-Paterson Air Force Base, Ohio.

(Continued)

*Primary Examiner* — Christopher Verdier

(57) ABSTRACT

A swept turbomachinery blade for use in a cascade of such blades is disclosed. The blade (12) has an airfoil (22) uniquely swept so that an endwall shock (64) of limited radial extent and a passage shock (66) are coincident and a working medium (48) flowing through interblade passages (50) is subjected to a single coincident shock rather than the individual shocks. In one embodiment of the invention the forwardmost extremity of the airfoil defines an inner transition point (40) located at an inner transition radius $r_t$-inner. The sweep angle of the airfoil is nondecreasing with increasing radius from the inner transition radius to an outer transition radius $r_{t\text{-}outer}$, radially inward of the airfoil tip (26), and is nonincreasing with increasing radius between the outer transition radius and the airfoil tip.

7 Claims, 7 Drawing Sheets

U.S. PATENT DOCUMENTS

| | | | | | |
|---|---|---|---|---|---|
| 2,915,238 | A | | 12/1959 | Szydlowski | |
| 2,934,259 | A | | 4/1960 | Hausmann | |
| 2,935,246 | A | | 5/1960 | Roy | |
| 3,416,725 | A | | 12/1968 | Bohanon | |
| 3,444,817 | A | | 5/1969 | Caldwell | |
| 3,546,882 | A | * | 12/1970 | Berkey | 60/204 |
| 3,692,425 | A | | 9/1972 | Erwin | |
| 3,843,277 | A | * | 10/1974 | Ehrich | 415/119 |
| 3,989,406 | A | | 11/1976 | Bliss | |
| 4,012,165 | A | | 3/1977 | Kraig | |
| 4,012,172 | A | | 3/1977 | Schwaar et al. | |
| 4,274,810 | A | | 6/1981 | Nishikawa | |
| 4,358,246 | A | | 11/1982 | Hanson et al. | |
| 4,370,097 | A | | 1/1983 | Hanson et al. | |
| 4,408,957 | A | | 10/1983 | Kurzrock et al. | |
| 4,714,407 | A | | 12/1987 | Cox et al. | |
| 4,726,737 | A | | 2/1988 | Weingold et al. | |
| 4,737,077 | A | | 4/1988 | Vera | |
| 4,784,575 | A | | 11/1988 | Nelson et al. | |
| 5,064,345 | A | | 11/1991 | Kimball | |
| 5,112,192 | A | | 5/1992 | Weetman | |
| 5,167,489 | A | | 12/1992 | Wadia et al. | |
| 5,408,826 | A | | 4/1995 | Stewart et al. | |
| 5,513,952 | A | * | 5/1996 | Mizuta et al. | 415/220 |
| 5,584,661 | A | | 12/1996 | Brooks | |
| 6,071,077 | A | | 6/2000 | Rowlands | |
| RE38,040 | E | * | 3/2003 | Spear et al. | 415/181 |

FOREIGN PATENT DOCUMENTS

| | | | | | |
|---|---|---|---|---|---|
| EP | 0266298 | | | 5/1988 | |
| EP | 0774567 | | | 5/1997 | |
| EP | 0801230 | | | 10/1997 | |
| FR | 996967 | A | * | 12/1951 | 415/220 |
| FR | 2459387 | | | 1/1981 | |
| RU | 1528965 | | | 12/1989 | 416/242 |
| SU | 1528965 | | | 12/1989 | |
| WO | WO 9107593 | | | 5/1991 | |

OTHER PUBLICATIONS

Cheatham et al., "Parametric Blade Study," Nov. 1989, Report No. WRDC-TR-89-2121, Aero Propulsion and Power Laboratory, Wright Aeronautical Research & Development Center, Wright-Patterson Air Force Base, Ohio.

European Search Report, dated Feb. 25, 1998, in EP 774,567.

European Patent Office Official Action, dated Sep. 24, 1998, in EP 774,567.

European Patent Office Official Action, dated Jan. 21, 2002, in EP 801,203.

Leading edge sweep angle profiles of fan blades of Pratt & Whitney PW305 and PW306 gas turbine engines.

* cited by examiner

SWEPT TURBOMACHINERY BLADE

Matter enclosed in heavy brackets [ ] appears in the original patent but forms no part of this reissue specification; matter printed in italics indicates the additions made by reissue.

*CROSS-REFERENCE TO RELATED APPLICATIONS*

*This is a continuation of application Ser. No. 09/343,736, filed Jun. 30, 1999 now U.S. Pat. No. Re. 38,040, seeking reissue of U.S. Pat. No. 5,642,985, issued Jul. 1, 1997.*

*STATEMENT REGARDING GOVERNMENT RIGHTS*

*The government has certain rights to this invention under Department of Defense Contract No. N00140-91-C-2793.*

TECHNICAL FIELD

This invention relates to turbomachinery blades, and particularly to blades whose airfoils are swept to minimize the adverse effects of supersonic flow of a working medium over the airfoil surfaces.

BACKGROUND OF THE INVENTION

Gas turbine engines employ cascades of blades to exchange energy with a compressible working medium gas that flows axially through the engine. Each blade in the cascade has an attachment which engages a slot in a rotatable hub so that the blades extend radially outward from the hub. Each blade has a radially extending airfoil, and each airfoil cooperates with the airfoils of the neighboring blades to define a series of interblade flow passages through the cascade. The radially outer boundary of the flow passages is formed by a case which circumscribes the airfoil tips. The radially inner boundary of the passages is formed by abutting platforms which extend circumferentially from each blade.

During engine operation the hub, and therefore the blades attached thereto, rotate about a longitudinally extending rotational axis. The velocity of the working medium relative to the blades increases with increasing radius. Accordingly, it is not uncommon for the airfoil leading edges to be swept forward or swept back to mitigate the adverse aerodynamic effects associated with the compressibility of the working medium at high velocities.

One disadvantage of a swept blade results from pressure waves which extend along the span of each airfoil suction surface and reflect off the surrounding case. Because the airfoil is swept, both the incident waves and the reflected waves are oblique to the case. The reflected waves interact with the incident waves and coalesce into a planar aerodynamic shock which extends across the interblade flow channel between neighboring airfoils. These "endwall shocks" extend radially inward a limited distance from the case. In addition, the compressibility of the working medium causes a passage shock, which is unrelated to the above described endwall shock, to extend across the passage from the leading edge of each blade to the suction surface of the adjacent blade. As a result, the working medium gas flowing into the channels encounters multiple shocks and experiences unrecoverable losses in velocity and total pressure, both of which degrade the engine's efficiency. What is needed is a turbomachinery blade whose airfoil is swept to mitigate the effects of working medium compressibility while also avoiding the adverse influences of multiple shocks.

DISCLOSURE OF THE INVENTION

It is therefore an object of the invention to minimize the aerodynamic losses and efficiency degradation associated with endwall shocks by limiting the number of shocks in each interblade passage.

According to the invention, a blade for a blade cascade has an airfoil which is swept over at least a portion of its span, and the section of the airfoil radially coextensive with the endwall shock intercepts the endwall shock extending from the neighboring airfoil so that the endwall shock and the passage shock are coincident.

In one embodiment the axially forwardmost extremity of the airfoil's leading edge defines an inner transition point located at an inner transition radius radially inward of the airfoil tip. An outer transition point is located at an outer transition radius radially intermediate the inner transition radius and the airfoil tip. The outer transition radius and the tip bound a blade tip region while the inner and outer transition radii bound an intermediate region. The leading edge is swept at a first sweep angle in the intermediate region and is swept at a second sweep angle over at least a portion of the tip region. The first sweep angle is generally nondecreasing with increasing radius and the second sweep angle is generally non-increasing with increasing radius.

The invention has the advantage of limiting the number of shocks in each interblade passage so that engine efficiency is maximized.

BEST MODE FOR CARRYING OUT THE INVENTION

Figure 1:
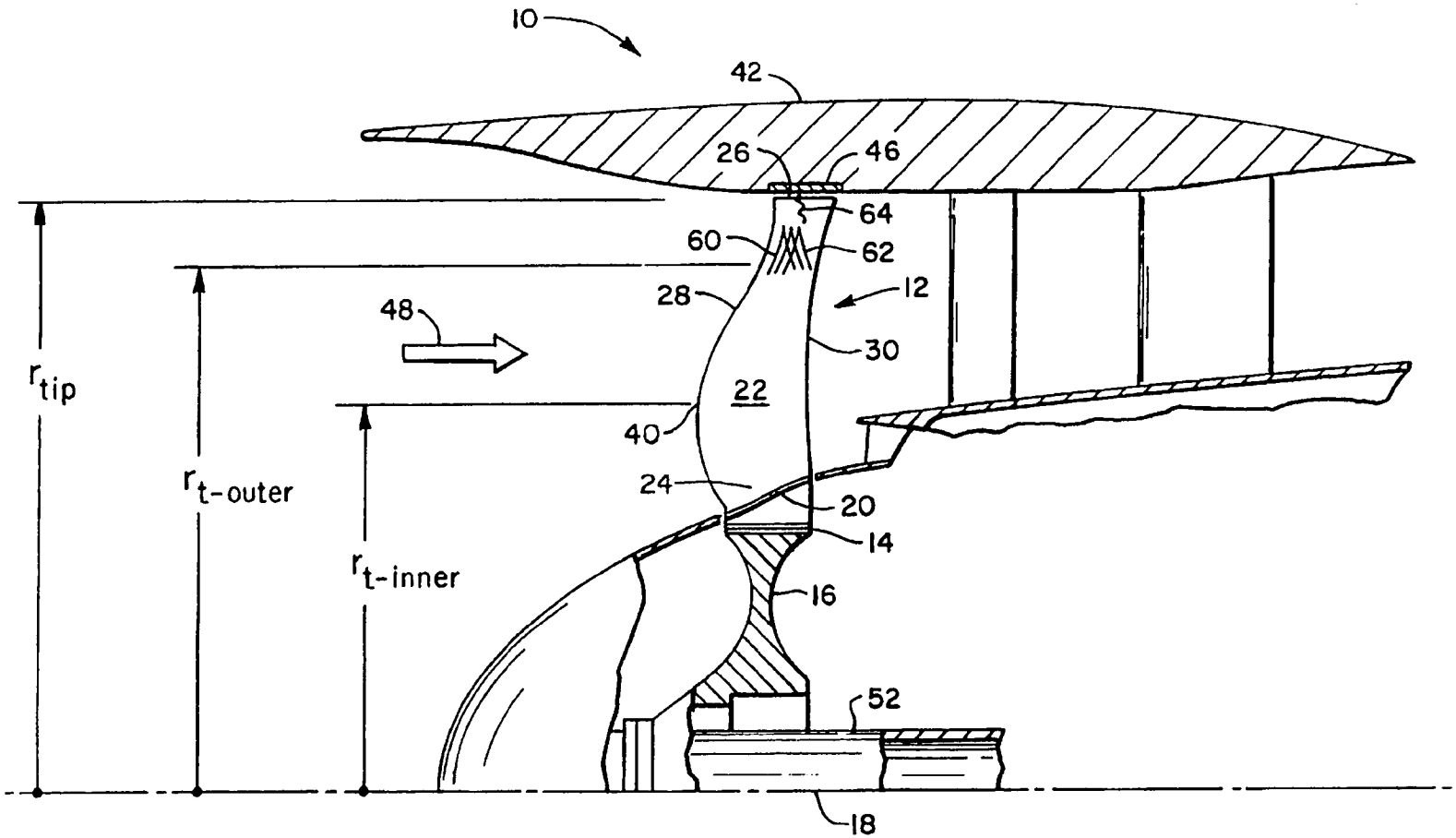
FIG. 1 is a cross sectional side elevation of the fan section of a gas turbine engine showing a swept back fan blade according to the present invention.
Figure 2:
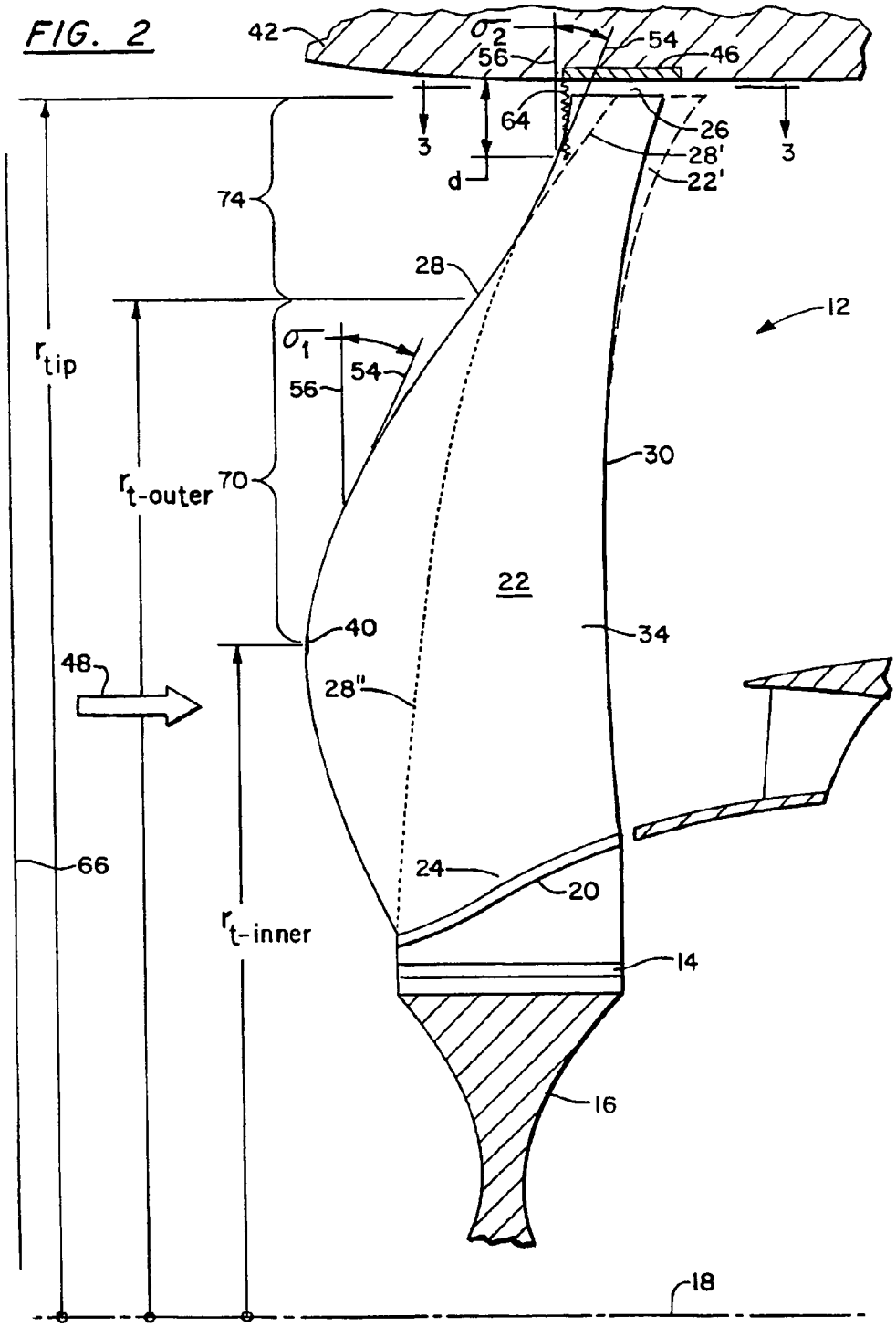
FIG. 2 is an enlarged view of the blade of FIG. 1 including an alternative leading edge profile shown by dotted lines and a prior art blade shown in phantom.
Figure 3:
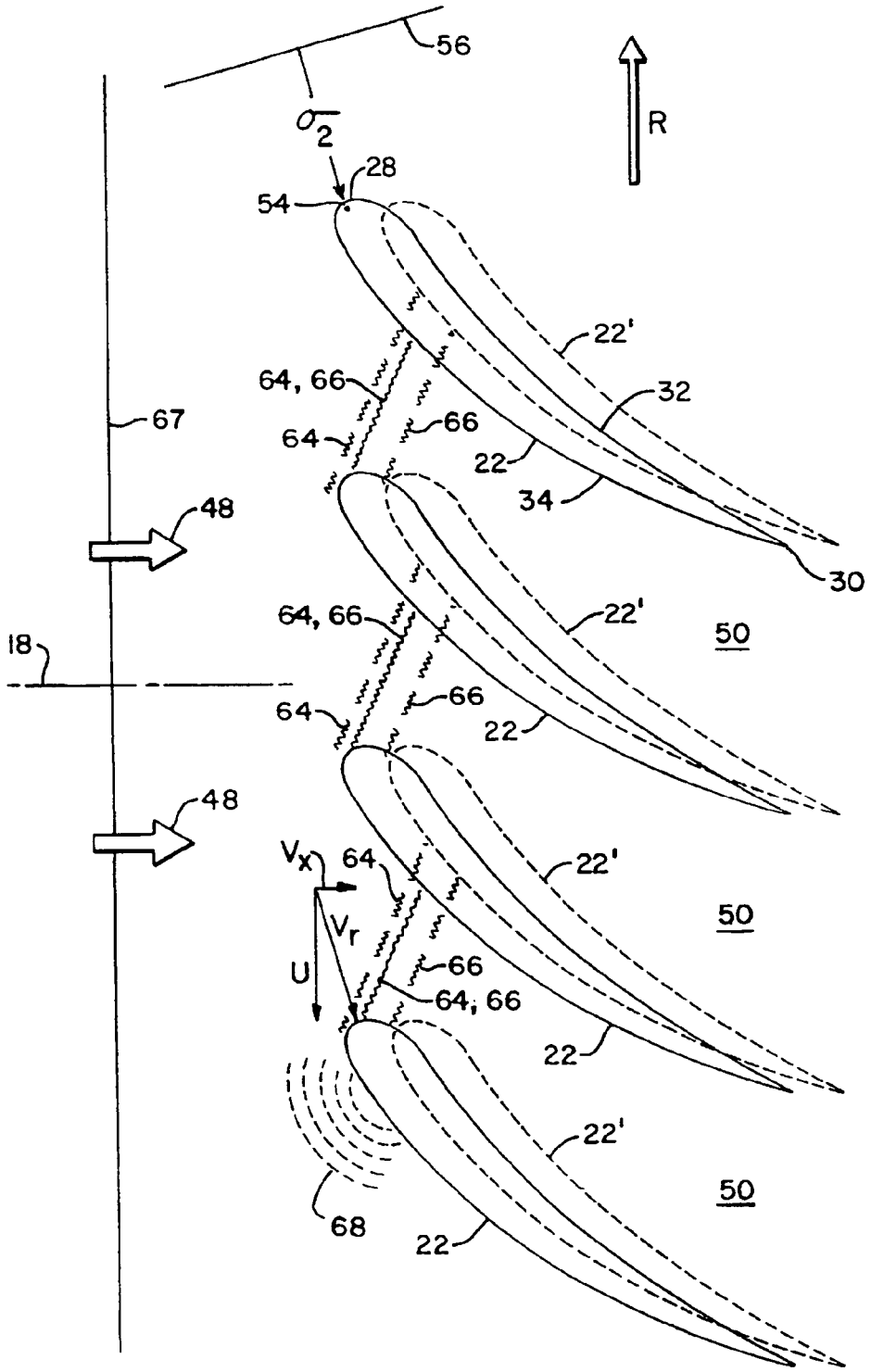
FIG. 3 is a developed view taken along the line 3-3 of FIG. 2 illustrating the tips of four blades of the present invention along with four prior art blades shown in phantom.

Referring to FIGS. 1-3, the forward end of a gas turbine engine includes a fan section 10 having a cascade of fan blades 12. Each blade has an attachment 14 for attaching the blade to a disk or hub 16 which is rotatable about a longitudinally extending rotational axis 18. Each blade also has a circumferentially extending platform 20 radially outward of the attachment. When installed in an engine, the platforms of neighboring blades in the cascade abut each other to form the cascade's inner flowpath boundary. An airfoil 22 extending radially outward from each platform has a root 24, a tip 26, a leading edge 28, a trailing edge 30, a pressure surface 32 and a suction surface 34. The axially forwardmost extremity of the leading edge defines an inner transition point 40 at an inner transition radius $r_t$-inner, radially inward of the tip. The blade cascade is circumscribed by a case 42 which forms the cascade's outer flowpath boundary. The case includes a rub-strip 46 which partially abrades away in the event that a rotating blade contacts the case during engine operation. A working medium fluid such as air 48 is pressurized as it flows axially through interblade passages 50 between neighboring airfoils.

The hub 16 is attached to a shaft 52. During engine operation, a turbine (not shown) rotates the shaft, and therefore the hub and the blades, about the axis 18 in direction R. Each blade, therefore, has a leading neighbor which precedes it and a trailing neighbor which follows it during rotation of the blades about the rotational axis.

Figure 4:
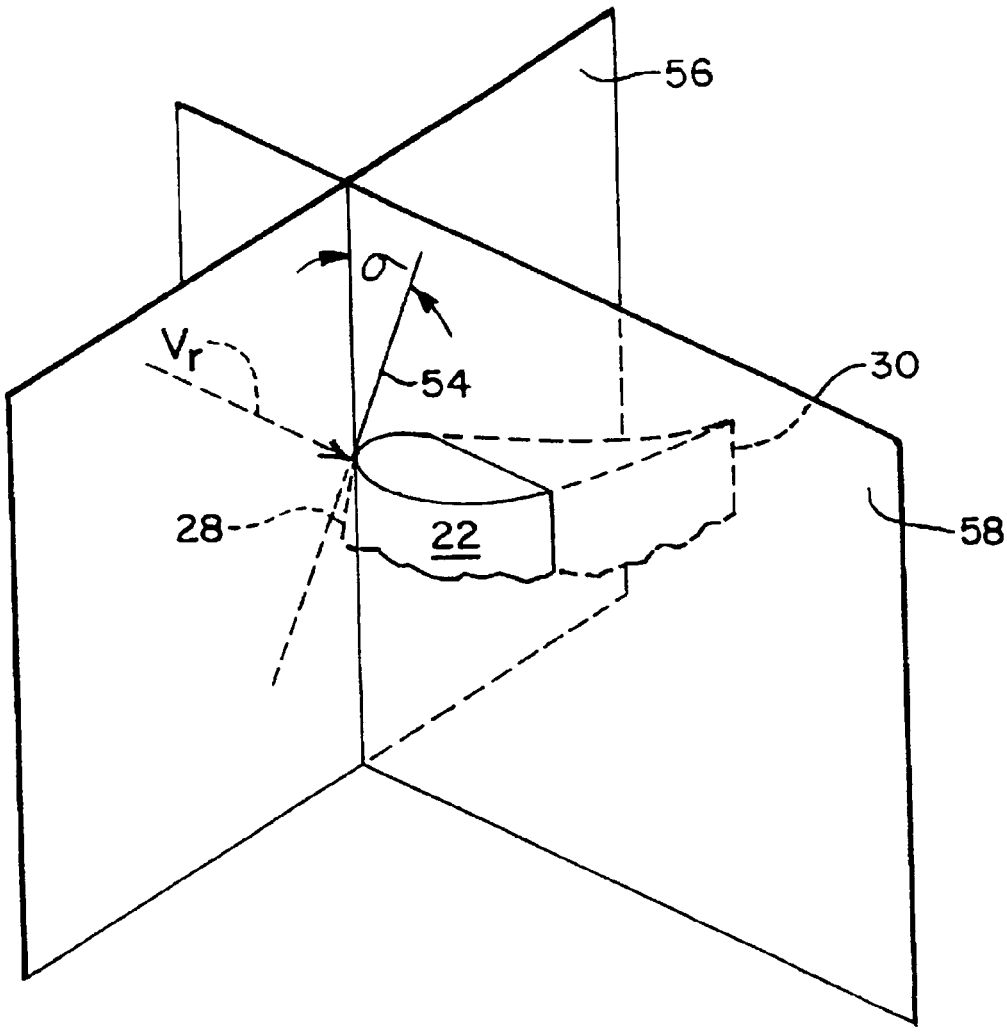
FIG. 4 is a schematic perspective view of an airfoil fragment illustrating the definition of sweep angle.
Figure 6:
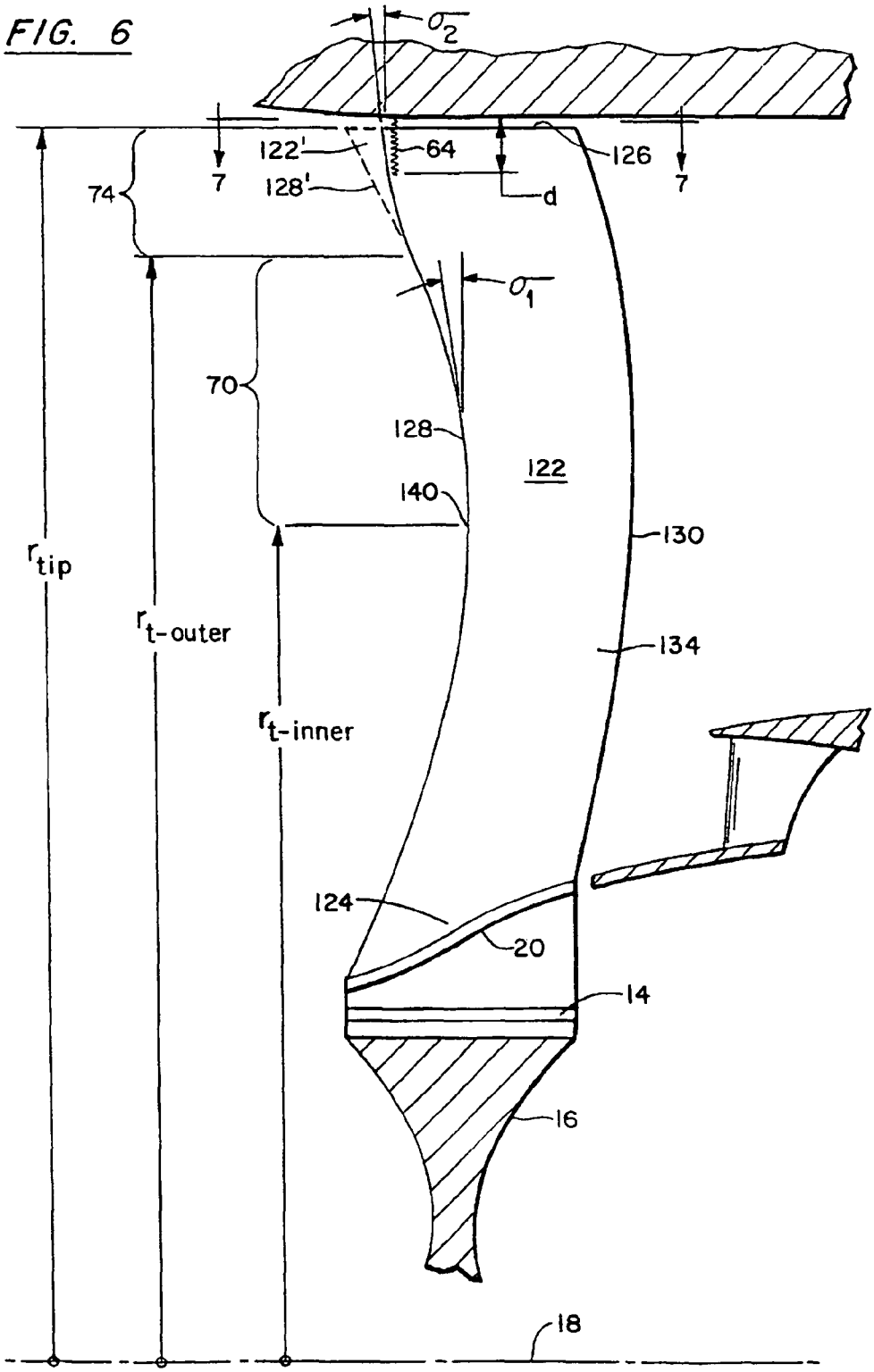
FIG. 6 is a cross sectional side elevation of the fan section of a gas turbine engine showing a forward swept fan blade according to the present invention and showing a prior art fan blade in phantom.

The axial velocity $V_x$ (FIG. 3) of the working medium is substantially constant across the radius of the flowpath. However the linear velocity U of a rotating airfoil increases with increasing radius. Accordingly, the relative velocity $V_r$ of the working medium at the airfoil leading edge increases with increasing radius, and at high enough rotational speeds, the airfoil experiences supersonic working medium flow velocities in the vicinity of its tip. Supersonic flow over an airfoil, while beneficial for maximizing the pressurization of the working medium, has the undesirable effect of reducing fan efficiency by introducing losses in the working medium's velocity and total pressure. Therefore, it is typical to sweep the airfoil's leading edge over at least a portion of the blade span so that the working medium velocity component in the chordwise direction (perpendicular to the leading edge) is subsonic. Since the relative velocity $V_r$ increases with increasing radius, the sweep angle typically increases with increasing radius as well. As shown in FIG. 4, the sweep angle $\sigma$ at any arbitrary radius is the acute angle between a line 54 tangent to the leading edge 28 of the airfoil 22 and a plane 56 perpendicular to the relative velocity vector $V_r$. The sweep angle is measured in plane 58 which contains both the relative velocity vector and the tangent line and is perpendicular to plane 56. In conformance with this definition sweep angles $\sigma_1$ and $\sigma_2$, referred to hereinafter and illustrated in FIGS. 2, 3 and 6 are shown as projections of the actual sweep angle onto the plane of the illustrations.

Sweeping the blade leading edge, while useful for minimizing the adverse effects of supersonic working medium velocity, has the undesirable side effect of creating an endwall reflection shock. The flow of the working medium over the blade suction surface generates pressure waves 60 (shown only in FIG. 1) which extend along the span of the blade and reflect off the case. The reflected waves 62 and the incident waves 60 coalesce in the vicinity of the case to form an endwall shock 64 across each interblade passage. The endwall shock extends radially inward a limited distance, d, from the case. As best seen in the prior art (phantom) illustration of FIG. 3, each endwall shock is also oblique to a plane 67 perpendicular to the rotational axis so that the shock extends axially and circumferentially. In principle, an endwall shock can extend across multiple interblade passages and affect the working medium entering those passages. In practice, expansion waves (as illustrated by the representative waves 68) propagate axially forward from each airfoil and weaken the endwall shock from the airfoil's leading neighbor so that each endwall shock usually affects only the passage where the endwall shock originated. In addition, the supersonic character of the flow causes passage shocks 66 to extend across the passages. The passage shocks, which are unrelated to endwall reflections, extend from the leading edge of each blade to the suction surface of the blade's leading neighbor. Thus, the working medium is subjected to the aerodynamic losses of multiple shocks with a corresponding degradation of engine efficiency.

The endwall shock can be eliminated by making the case wall perpendicular to the incident expansion waves so that the incident waves coincide with their reflections. However other design considerations, such as constraints on the flowpath area and limitations on the case construction, may make this option unattractive or unavailable. In circumstances where the endwall shock cannot be eliminated, it is desirable for the endwall shock to coincide with the passage shock since the aerodynamic penalty of coincident shocks is less than that of multiple individual shocks.

According to the present invention, coincidence of the endwall shock and the passage shock is achieved by uniquely shaping the airfoil so that the airfoil intercepts the endwall shock extending from the airfoil's leading neighbor and results in coincidence between the endwall shock and the passage shock.

A swept back airfoil according to the present invention has a leading edge 28, a trailing edge 30, a root 24 and a tip 26 located at a tip radius $r_{tip}$. An inner transition point 40 located at an inner transition radius $r_t$-inner is the axially forwardmost point on the leading edge. The leading edge of the airfoil is swept back by a radially varying first sweep angle $\sigma_1$ in an intermediate region 70 of the airfoil (in FIG. 2 plane 56 appears as the line defined by the plane's intersection with the plane of the illustration and in FIG. 3 the tangent line 54 appears as the point where the tangent line penetrates the plane of the Figure). The intermediate region 70 is the region radially bounded by the inner transition radius $r_t$-inner and the outer transition radius $r_t$-outer. The first sweep angle, as is customary in the art, is nondecreasing with increasing radius, i.e. the sweep angle increases, or at least does not decrease, with increasing radius.

The leading edge 28 of the airfoil is also swept back by a radially varying second sweep angle $\sigma_2$ in a tip region 74 of the airfoil. The tip region is radially bounded by the outer transition radius $r_t$-outer and a tip radius $r_{tip}$. The second sweep angle is nonincreasing (decreases, or at least does not increase) with increasing radius. This is in sharp contrast to the prior art airfoil 22' whose sweep angle increases with increasing radius radially outward of the inner transition radius.

The beneficial effect of the invention is appreciated primarily by reference to FIG. 3 which compares the invention (and the associated endwall and passage shocks) to a prior art blade (and its associated shocks) shown in phantom. Referring first to the prior art illustration in phantom, the endwall shock 64 originates as a result of the pressure waves 60 (FIG. 1) extending along the suction surface of each blade. Each endwall shock is oblique to a plane 67 perpendicular to the rotational axis, and extends across the interblade passage of origin. The passage shock 66 also extends across the flow passage from the leading edge of a blade to the suction surface of the blade's leading neighbor. The working medium entering the passages is therefore adversely influenced by multiple shocks. By contrast, the nonincreasing character of the second sweep angle of a swept back airfoil 22 according to the invention causes a portion of the airfoil leading edge to be far enough forward (upstream) in the working medium flow that the section of the airfoil radially coextensive with the endwall shock extending from the airfoil's leading neighbor intercepts the endwall shock 64 (the unique sweep of the airfoil does not appreciably affect the location or orientation of the endwall shock; the phantom endwall shock associated with the prior art blade is illustrated slightly upstream of the endwall shock for the airfoil of the invention for illustrative clarity). In addition, the passage shock 66 (which remains attached to the airfoil leading edge and therefore is translated forward along with the leading edge) is brought into coincidence with the endwall shock so that the working medium does not encounter multiple shocks.

Figure 5:
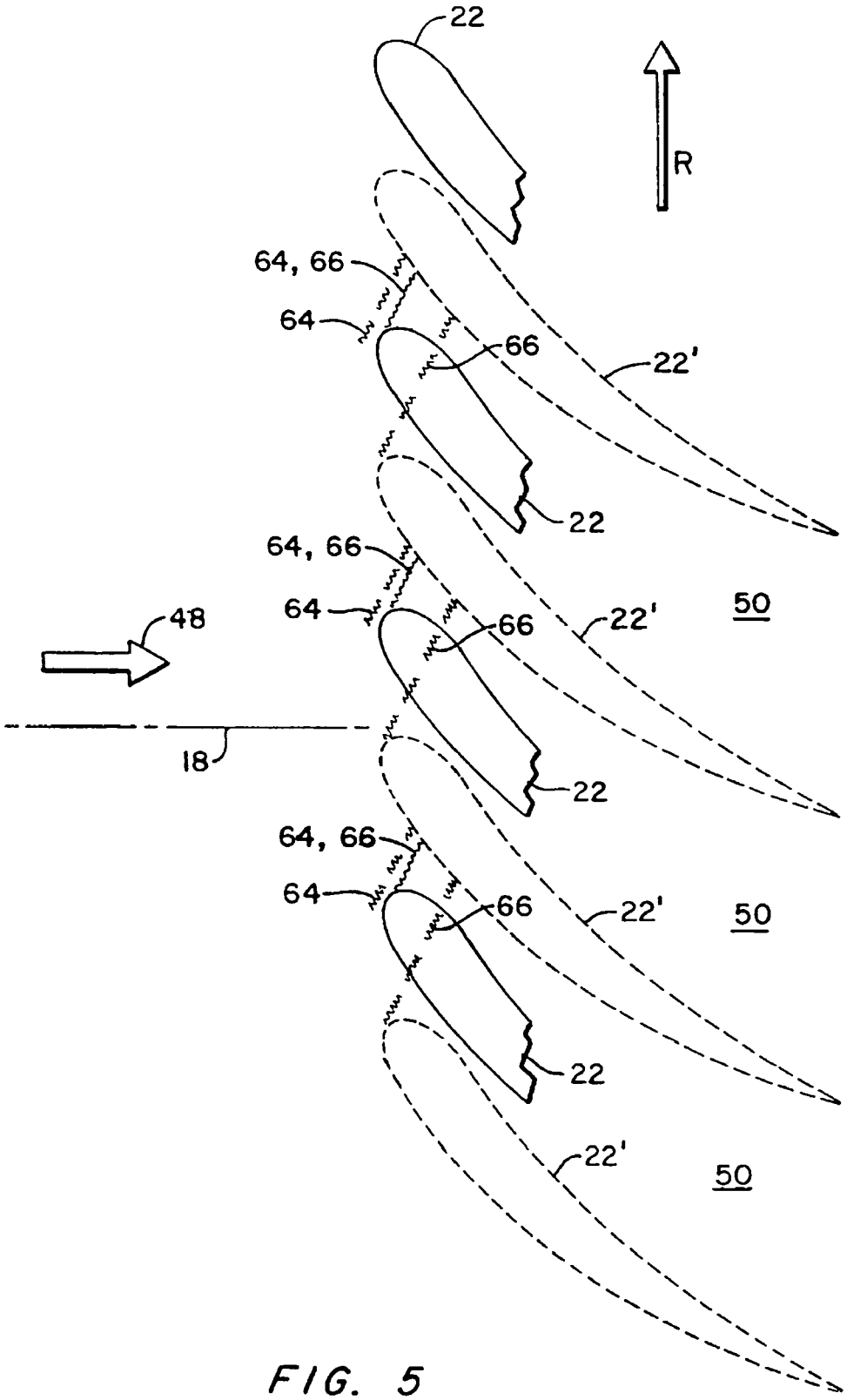
FIG. 5 is a developed view similar to FIG. 3 illustrating an alternative embodiment of the invention and showing prior art blades in phantom.

The embodiment of FIGS. 2 and 3 illustrates a blade whose leading edge, in comparison to the leading edge of a conventional blade, has been translated axially forward parallel to the rotational axis (the corresponding translation of the trailing edge is an illustrative convenience—the location of the trailing edge is not embraced by the invention). However the invention contemplates any blade whose airfoil intercepts the endwall shock to bring the passage shock into coincidence with the endwall shock. For example, FIG. 5 illustrates an embodiment where a section of the tip region is displaced circumferentially (relative to the prior art blade) so that the blade intercepts the endwall shock 64 and brings it into coincidence with the passage shock 66. As with the embodiment of FIG. 3, the displaced section extends radially inward far enough to intercept the endwall shock over its entire radial extent and brings it into coincidence with the passage shock 66. This embodiment functions as effectively as the embodiment of FIG. 3 in terms of bringing the passage shock into coincidence with the endwall shock. However it suffers from the disadvantage that the airfoil tip is curled in the direction of rotation R. In the event that the blade tip contacts the rubstrip 46 during engine operation, the curled blade tip will gouge rather than abrade the rubstrip necessitating its replacement. Other alternative embodiments may also suffer from this or other disadvantages.

Figure 7:
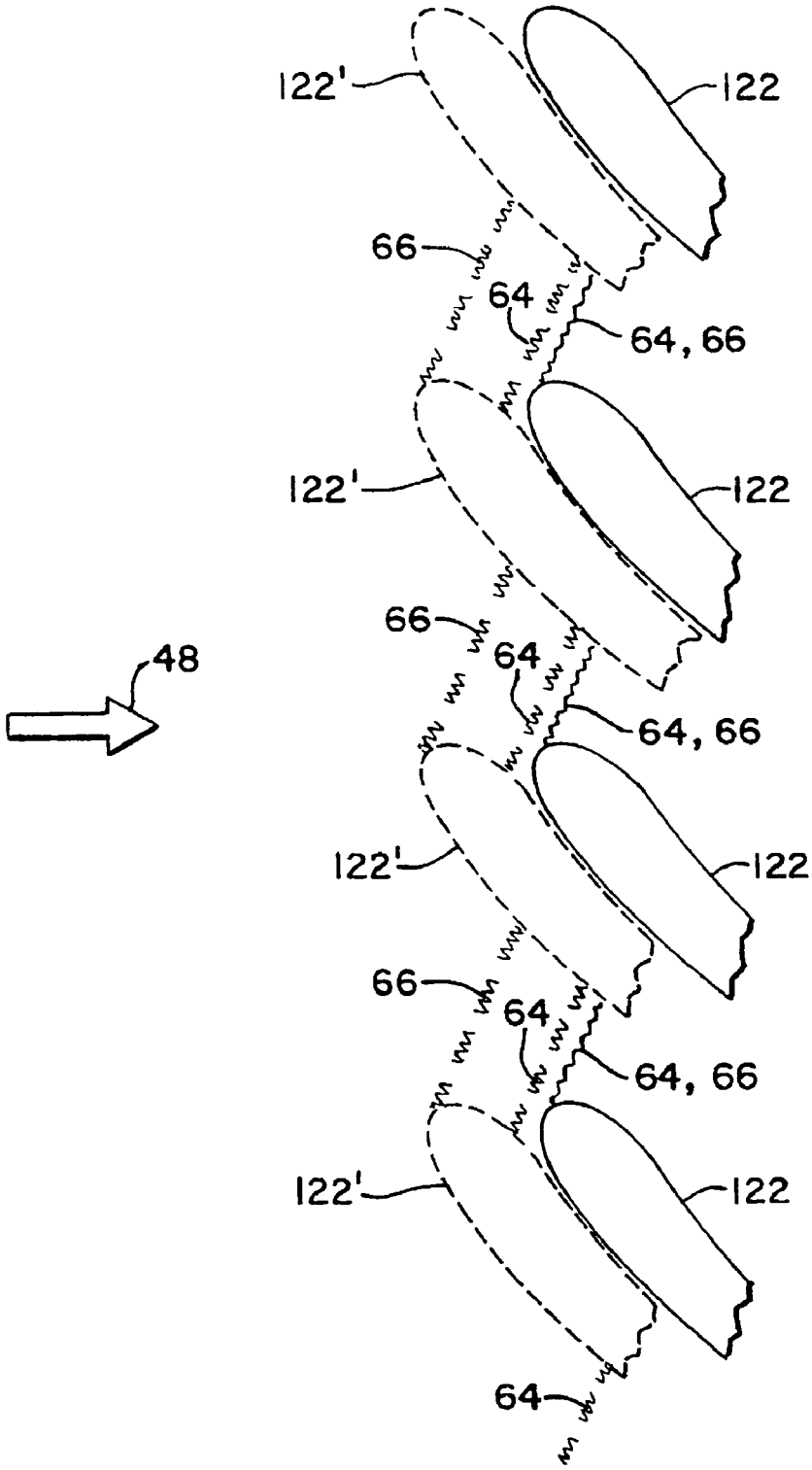
FIG. 7 is a developed view taken along the line 7-7 of FIG. 6 illustrating the tips of four blades of the present invention along with four prior art blades shown in phantom.

The invention's beneficial effects also apply to a blade having a forward swept airfoil. Referring to FIGS. 6 and 7, a forward swept airfoil 122 according to the present invention has a leading edge 128, a trailing edge 130, a root 124 and a tip 126 located at a tip radius $r_{tip}$. An inner transition point 140 located at an inner transition radius $r_t$-inner is the axially aftmost point on the leading edge. The leading edge of the airfoil is swept forward by a radially varying first sweep angle $\sigma_1$ in an intermediate region 70 of the airfoil. The intermediate region is radially bounded by the inner transition radius $r_t$-inner and the outer transition radius $r_t$-outer. The first sweep angle $\tau_1$ is nondecreasing with increasing radius, i.e. the sweep angle increases, or at least does not decrease, with increasing radius.

The leading edge 128 of the airfoil is also swept forward by a radially varying second sweep angle $\sigma_2$ in a tip region 74 of the airfoil. The tip region is radially bounded by the outer transition radius $r_t$-outer and the tip radius $r_{tip}$. The second sweep angle is nonincreasing (decreases, or at least does not increase) with increasing radius. This is in sharp contrast to the prior art airfoil 122' whose sweep angle increases with increasing radius radially outward of the inner transition radius.

In the forward swept embodiment of the invention, as in the swept back embodiment, the nonincreasing sweep angle $\sigma_2$ in the tip region 74 causes the endwall shock 64 to be coincident with the passage shock 66 for reducing the aerodynamic losses as discussed previously. This is in contrast to the prior art blade, shown in phantom where the endwall shock and the passage shock are distinct and therefore impose multiple aerodynamic losses on the working medium.

In the swept back embodiment of FIG. 2, the inner transition point is the axially forwardmost point on the leading edge. The leading edge is swept back at radii greater than the inner transition radius. The character of the leading edge sweep inward of the inner transition radius is not embraced by the invention. In the forward swept embodiment of FIG. 6, the inner transition point Is the axially aftmost point on the leading edge. The leading edge is swept forward at radii greater than the inner transition radius. As with the swept back embodiment, the character of the leading edge sweep inward of the inner transition radius is not embraced by the invention. In both the forward swept and back swept embodiments, the inner transition point is illustrated as being radially outward of the airfoil root. However the invention also comprehends a blade whose inner transition point (axially forwardmost point for the swept back embodiment and axially aftmost point for the forward swept embodiment) is radially coincident with the leading edge of the root. This is shown, for example, by the dotted leading edge 28" of FIG. 2.

The invention has been presented in the context of a fan blade for a gas turbine engine, however, the invention's applicability extends to any turbomachinery airfoil wherein flow passages between neighboring airfoils are subjected to multiple shocks.

We claim:

1. A turbomachinery blade for a turbine engine having a cascade of blades rotatable about a rotational axis so that each blade in the cascade has a leading neighbor and a trailing neighbor, and each blade cooperates with its neighbors to define flow passages for a working medium gas, the blade cascade being circumscribed by a case and under some operational conditions an endwall shock extends a limited distance radially inward from the case and also extends axially and circumferentially across the flow passages, and a passage shock also extends across the flow passages, the turbomachinery blade including an airfoil having a leading edge, a trailing edge, a root, a tip and an inner transition point located at an inner transition radius radially inward of the tip, the blade characterized in that at least a portion of the leading edge radially outward of the inner transition point is swept and a section of the airfoil radially coextensive with the endwall shock extending from the leading neighbor intercepts the endwall shock so that the endwall shock and the passage shock are coincident.

2. A turbomachinery blade for a turbine engine having a cascade of blades rotatable about a rotational axis so that each blade in the cascade has a leading neighbor and a trailing neighbor, and each blade cooperates with its neighbors to define flow passages for a working medium gas, the blade cascade being circumscribed by a case and under some operational conditions an endwall shock extends a limited distance radially inward from the case and also extends axially and circumferentially across the flow passages and a passage shock also extends across the flow passages, the turbomachinery blade including an airfoil having a leading edge, a trailing edge, a root, a tip located at a tip radius, an inner transition point located at an inner transition radius radially inward of the tip, and an outer transition point at an outer transition radius radially intermediate the inner transition radius and the tip radius, the blade having a tip region bounded by the outer transition radius and the tip radius, and an intermediate region bounded by the inner transition radius and the outer transition radius, the blade characterized in that the leading edge is swept in the intermediate region at a first sweep angle which is generally nondecreasing with increasing radius, and the leading edge is swept over at least a portion of the tip region at a second sweep angle which is generally nonincreasing with increasing radius so that the section of the airfoil radially coextensive with the endwall shock extending from the leading neighbor intercepts the endwall shock so that the endwall shock and the passage shock are coincident.

3. The turbomachinery blade of claim 1 or 2 characterized in that the inner transition radius is coincident with the root at the leading edge of the blade.

*4. A fan stage of a ducted fan gas turbine engine that is rotatable about an axis of rotation and defines a downstream direction along the axis of rotation, comprising:*

*a fan casing that defines an inner duct wall having a fan rotor region;*

*a hub disposed concentrically relative to the fan casing;*

*a fan rotor that includes multiple swept fan blades, the swept fan blades being spaced apart around the hub, each of the multiple swept fan blades having:*

*a tip profile that corresponds to the inner duct wall of the fan casing;*

*a leading edge that defines a variable sweep angle in a direction perpendicular to the axis of rotation, the leading edge including:*

*an inner region adjacent the hub, the inner region defining a forward sweep angle;*

*an intermediate region between the inner region and the fan casing, the intermediate region defining a rearward sweep angle; and*

*an outer region between the intermediate region and the fan casing, the outer region being translated forward relative to a leading edge with the same sweep angle as an outward boundary of the intermediate region.*

*5. The fan stage according to claim 4, wherein the leading edge at a boundary between the intermediate region and the inner region extends further upstream along the axis of rotation than the leading edge of the inner region.*

*6. The fan stage according to claim 4, wherein each of the multiple swept fan blades includes a hub contacting surface that extends further than the tip profile along the axis of rotation.*

*7. A fan stage of a ducted fan gas turbine engine that is rotatable about an axis of rotation and defines a downstream direction along the axis of rotation, comprising:*

*a fan casing that defines an inner duct wall having a fan rotor region;*

*a hub disposed concentrically relative to the fan casing;*

*a fan rotor that includes multiple swept fan blades, the swept fan blades being spaced apart around the hub and being capable of rotating at speeds providing supersonic working medium gas velocities over the blades to cause a shock in the gas adjacent the inner duct wall, each of the multiple swept fan blades having:*

*a tip profile that corresponds to the inner duct wall of the fan casing;*

*a leading edge that defines a variable sweep angle in a direction perpendicular to the axis of rotation, the leading edge including:*

*an inner region adjacent the hub, the inner region defining a forward sweep angle;*

*an intermediate region between the inner region and the fan casing, the intermediate region defining a rearward sweep angle; and*

*an outer region between the intermediate region and the fan casing, the outer region being translated forward relative to a leading edge with the same sweep angle as an outward boundary of the intermediate region to provide a sweep angle that causes the blade to intercept the shock.*

* * * * *